US012559224B2

(12) United States Patent (10) Patent No.: US 12,559,224 B2
Joudon et al. (45) Date of Patent: Feb. 24, 2026

(54) BLADE OR VANE WITH A ROOT MADE BY CROSSING WEFT YARNS

(71) Applicant: SAFRAN, Paris (FR)

(72) Inventors: Vincent Joudon, Moissy-Cramayel (FR); Yann Didier Simon Marchal, Moissy-Cramayel (FR); Marc-Antoine André Louis Colot, Moissy-Cramayel (FR); Dominique Marie Christian Coupe, Moissy-Cramayel (FR); François Charleux, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 19/124,113

(22) PCT Filed: Oct. 16, 2023

(86) PCT No.: PCT/FR2023/051604
§ 371 (c)(1),
(2) Date: Apr. 24, 2025

(87) PCT Pub. No.: WO2024/089338
PCT Pub. Date: May 2, 2024

(65) Prior Publication Data
US 2026/0008535 A1 Jan. 8, 2026

(30) Foreign Application Priority Data
Oct. 25, 2022 (FR) ...................................... 2211055

(51) Int. Cl.
*B64C 11/26* (2006.01)
*B29B 11/16* (2006.01)
*D03D 25/00* (2006.01)

(52) U.S. Cl.
CPC .............. *B64C 11/26* (2013.01); *B29B 11/16* (2013.01); *D03D 25/005* (2013.01)

(58) Field of Classification Search
CPC ......... B29C 70/24; B29C 70/48; B29D 99/00; B64C 11/20; B64C 11/26; B64C 11/256;
(Continued)

(56) References Cited

U.S. PATENT DOCUMENTS 9,200,385 B2 * 12/2015 Dambrine .............. D03D 41/00
11,208,198 B2 * 12/2021 Courtier .................. B29C 70/24
(Continued)

FOREIGN PATENT DOCUMENTS

FR FR 3 091 724 A1 7/2020
FR FR 3 098 226 A1 1/2021
(Continued)

OTHER PUBLICATIONS

Joudon, et al., "Blade Comprising a Composite Material Structure and Associated Manufacturing Method," FR 3120249 A1, EPO, Sep. 2, 2022 (Year: 2022).*
(Continued)

*Primary Examiner* — Nathaniel E Wiehe
*Assistant Examiner* — Joshua R Beebe
(74) *Attorney, Agent, or Firm* — Pillsbury Winthrop Shaw Pittman LLP

(57) ABSTRACT

A method for manufacturing a propeller blade or vane made of composite material, includes making a single-piece fibrous blank by three-dimensional weaving between warp yarns and weft yarns, including an airfoil part and a root part including a non-interlinking, the root part including at least one changing sub-area in which the number of weft yarns crossing on either side of the non-interlinking increases gradually from the airfoil part to the free end of the root part, shaping the fibrous blank to obtain a fibrous preform,
(Continued)

densifying the preform by a matrix to obtain a propeller blade or vane made of composite material.

14 Claims, 8 Drawing Sheets

(58) Field of Classification Search
CPC .... D03D 25/00; D03D 15/267; D03D 15/275; D03D 25/005; B29L 31/08; B29B 11/16
See application file for complete search history.

(56) References Cited

U.S. PATENT DOCUMENTS

| | | | |
|---|---|---|---|
| 2006/0257260 A1 | 11/2006 | Dambrine et al. | |
| 2013/0017093 A1 | 1/2013 | Coupe et al. | |
| 2013/0272893 A1 | 10/2013 | Fabre et al. | |
| 2016/0159460 A1* | 6/2016 | Laurenceau | B29D 99/0025 |
| | | | 264/103 |
| 2022/0097824 A1* | 3/2022 | Courtier | F01D 5/282 |
| 2024/0141917 A1 | 5/2024 | Joudon | |

FOREIGN PATENT DOCUMENTS

| | | | |
|---|---|---|---|
| FR | 3 120 249 A1 | 9/2022 | |
| WO | JR WO A2 | 12/2006 | |
| | 2006/136755 | | |
| WO | WO 2019/197757 A1 | 10/2019 | |
| WO | WO 2021/001611 A1 | 1/2021 | |

OTHER PUBLICATIONS

International Search Report as issued in International Patent Application No. PCT/FR2023/051604, dated Jan. 31, 2024.
Written Opinion of the International Searching Authority as issued in International Patent Application No. PCT/FR2023/051604, dated Jan. 31, 2024.

* cited by examiner

[Fig. 1]
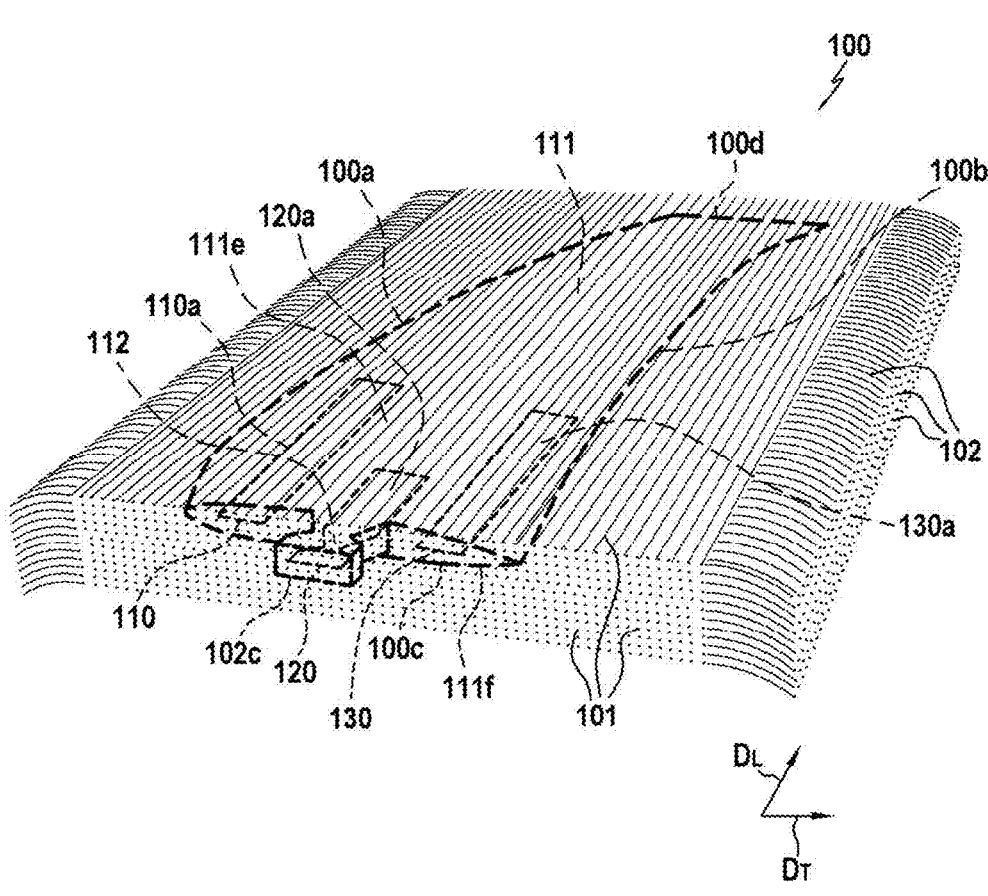

[Fig. 2]
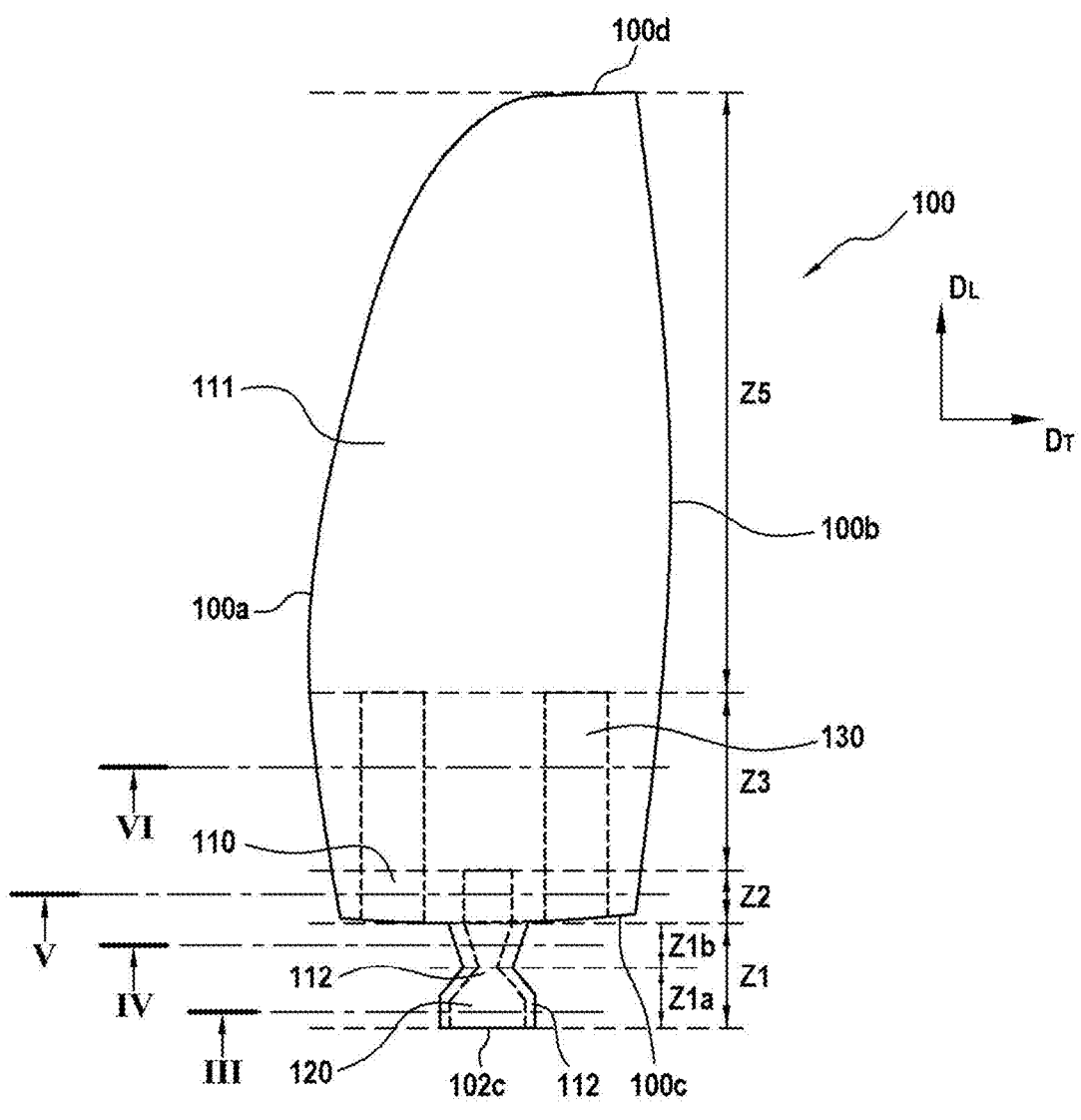

[Fig. 3]
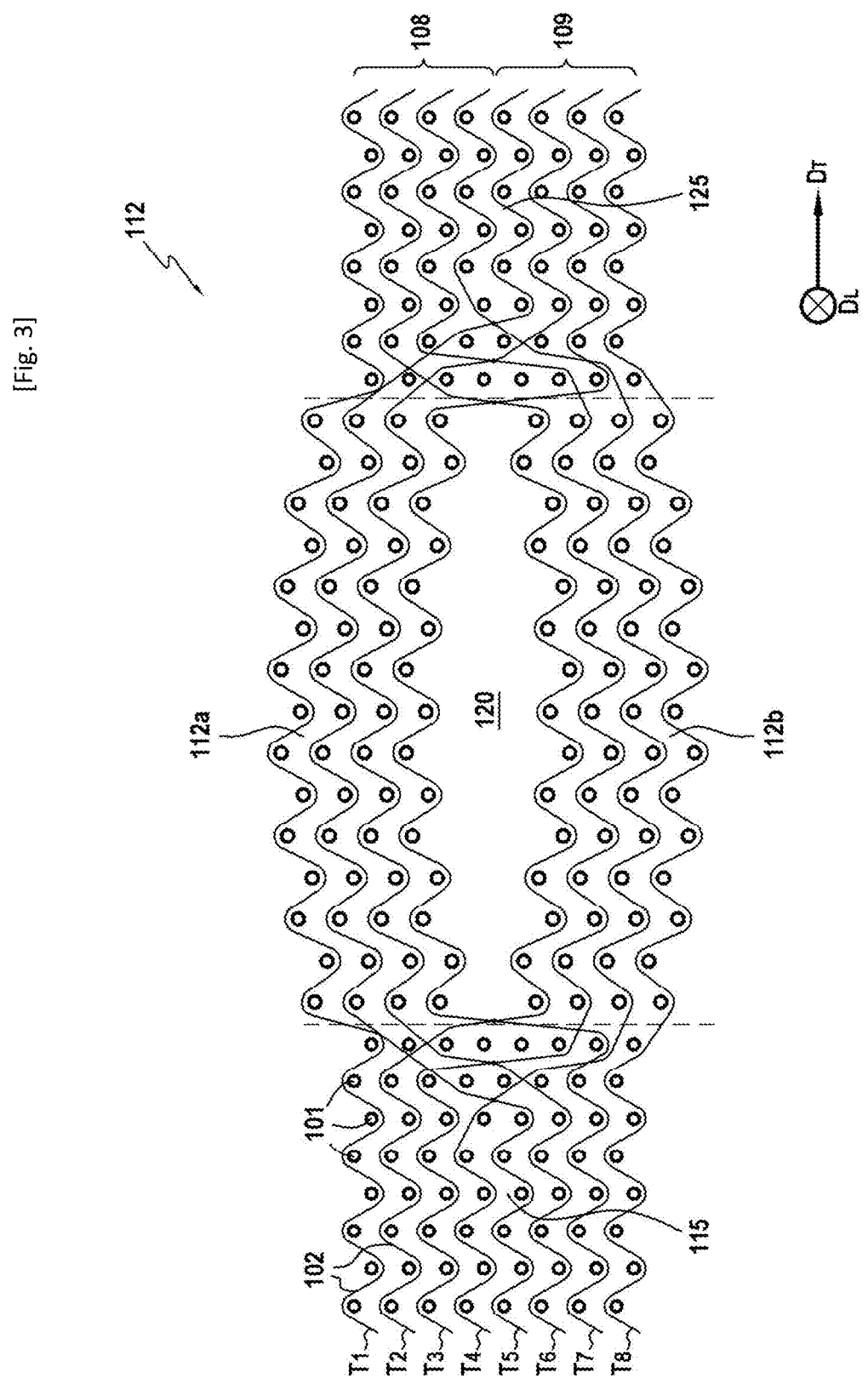

[Fig. 4]
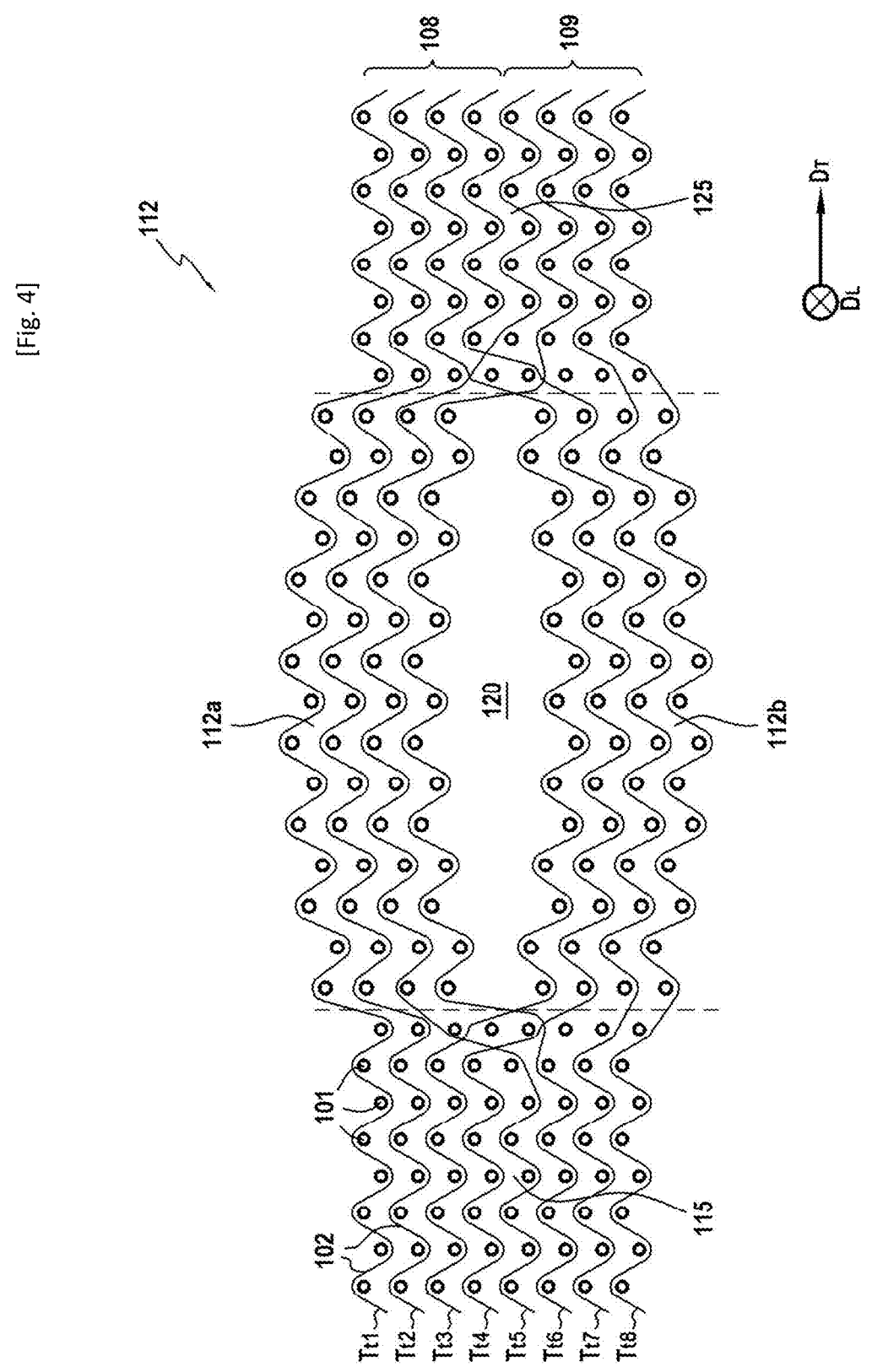

[Fig. 5]
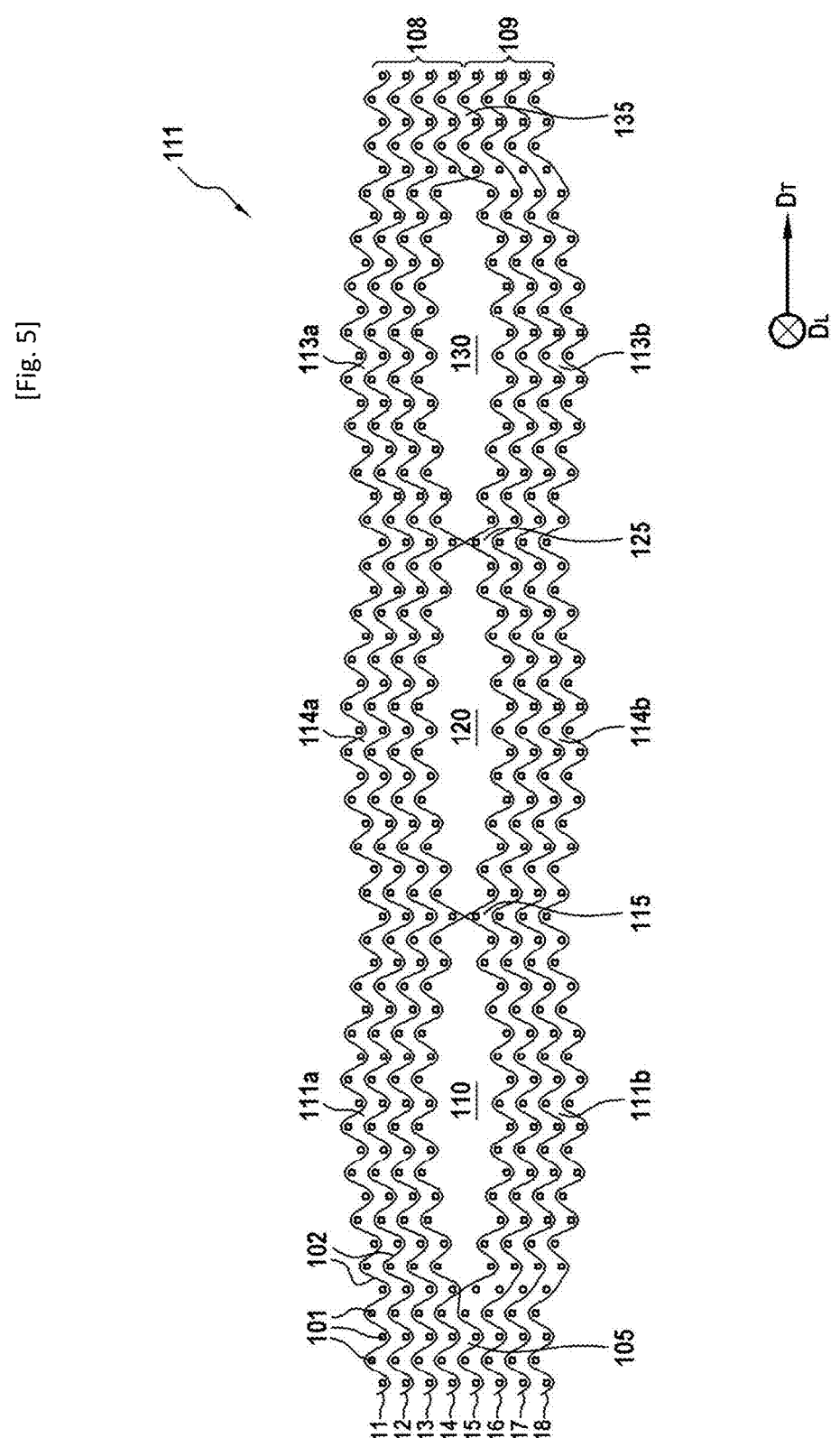

[Fig. 6]
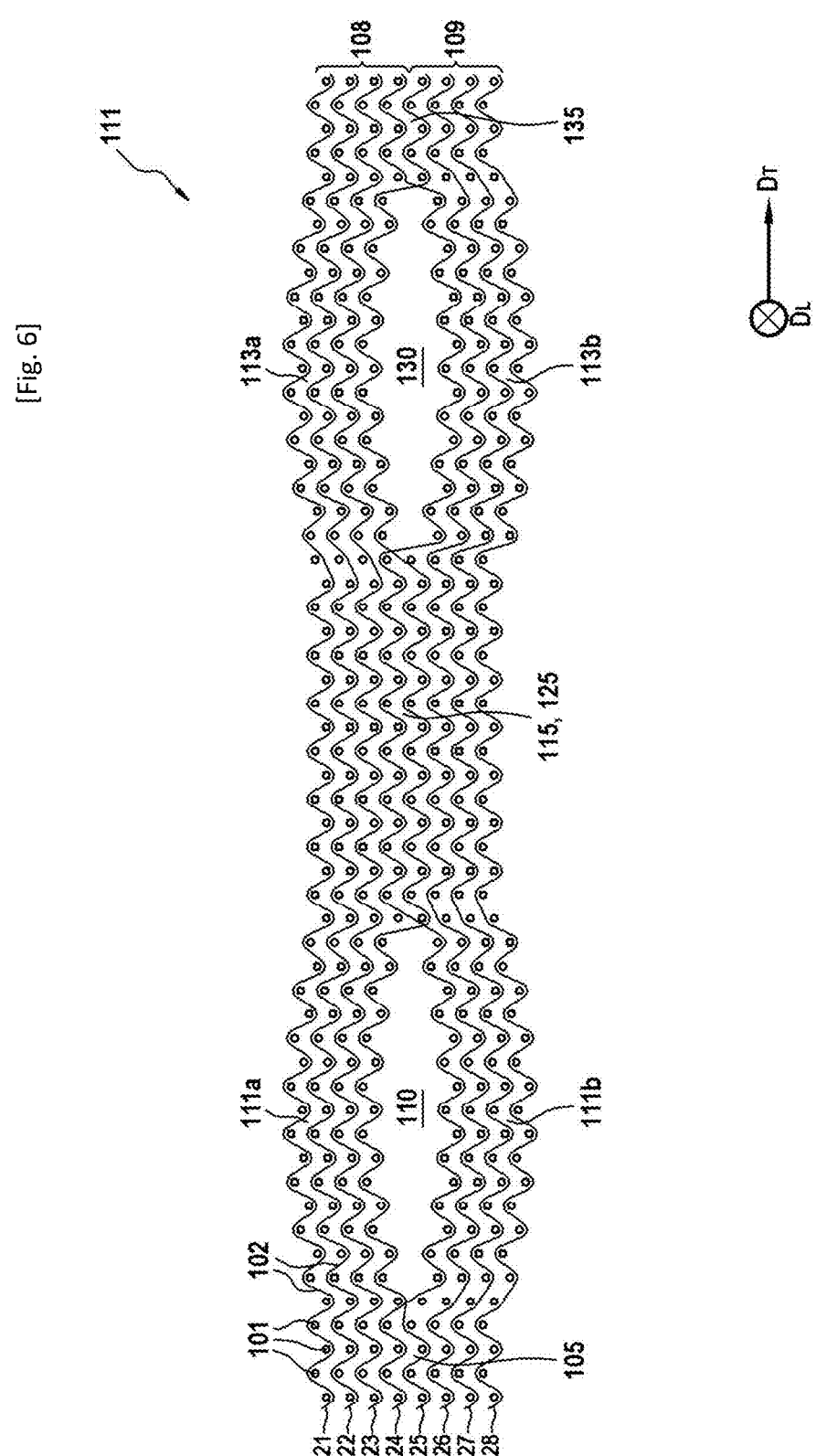

[Fig. 7]
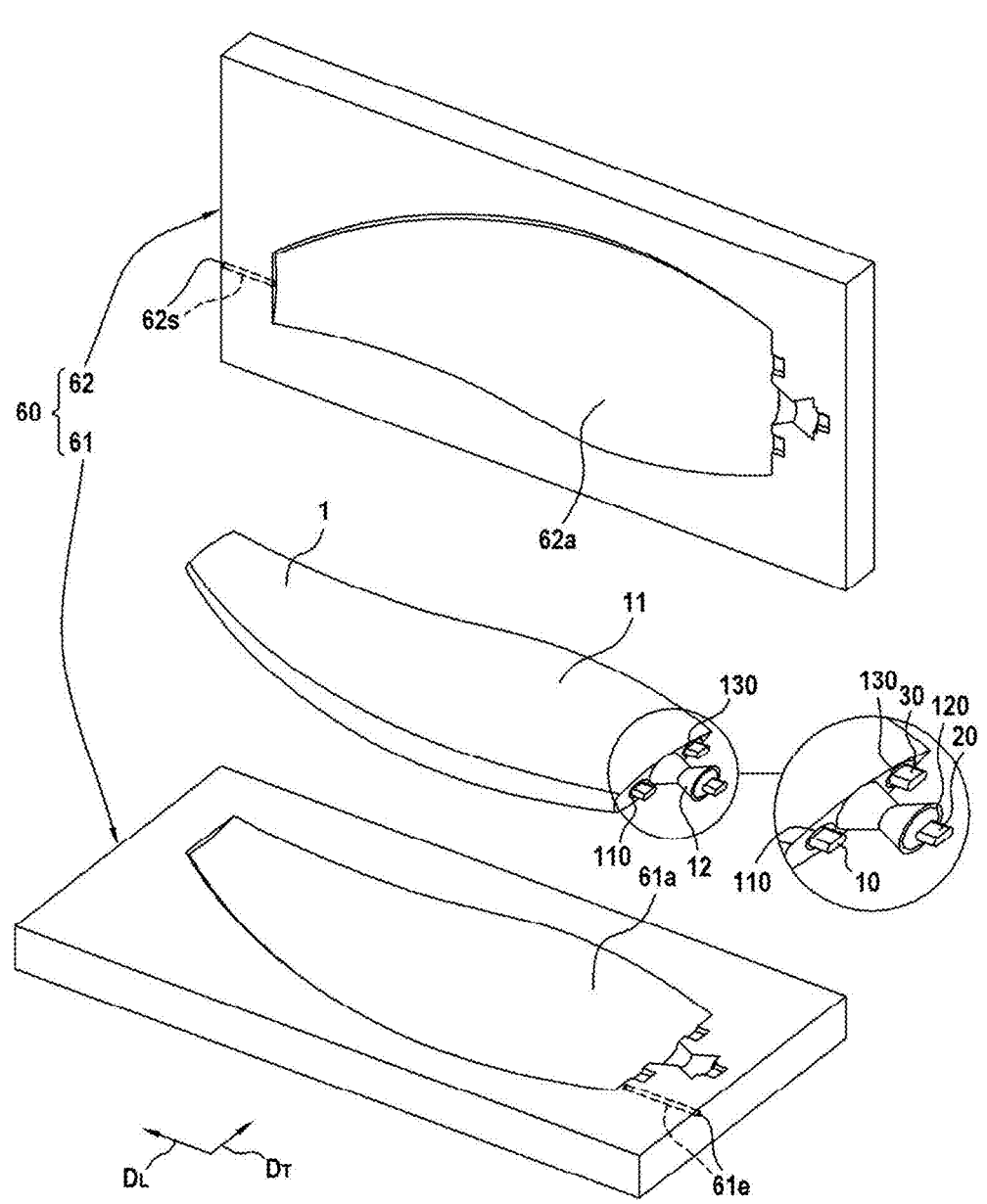

[Fig. 8]
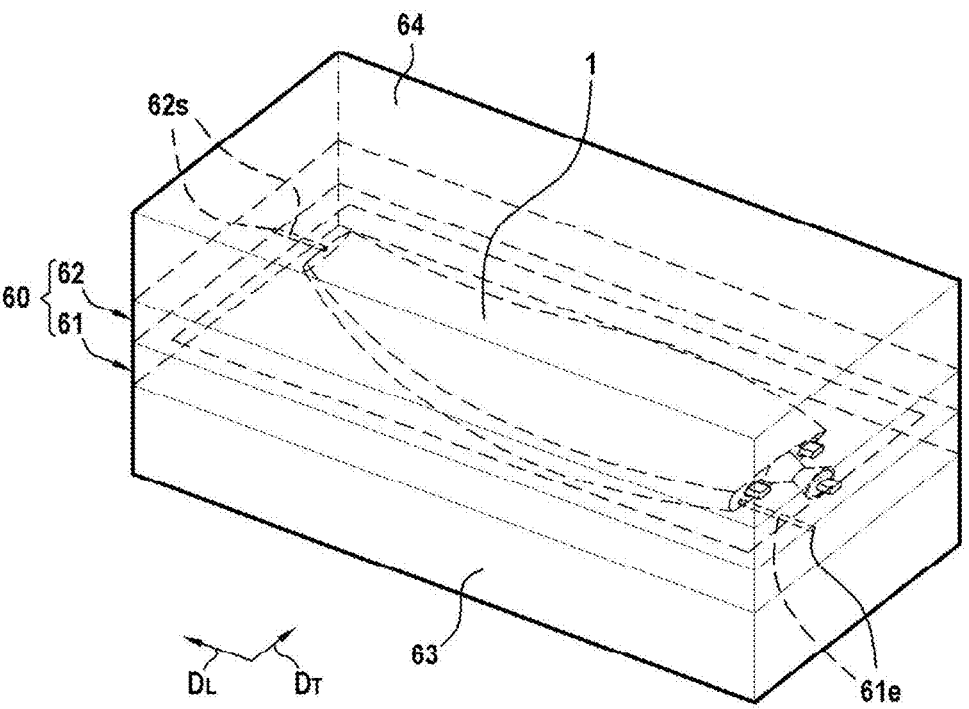
[Fig. 9]
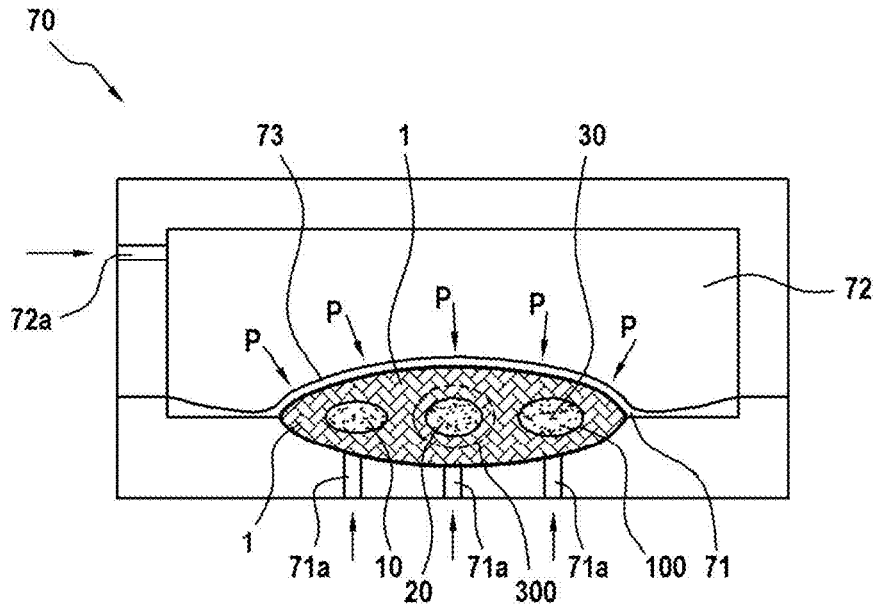

BLADE OR VANE WITH A ROOT MADE BY CROSSING WEFT YARNS

CROSS-REFERENCE TO RELATED APPLICATIONS

This application is the U.S. National Stage of PCT/FR2023/051604, filed Oct. 16, 2023, which in turn claims priority to French patent application number 22 11055 filed Oct. 25, 2022. The content of these applications are incorporated herein by reference in their entireties.

TECHNICAL FIELD

The present invention relates to the field of propeller blades or vanes for aircrafts such as those present on turboprop engines.

PRIOR ART

The propeller blades or vanes for turboprop engines are generally made of metal material. While the propeller blades or vanes made of metal material have good mechanical resistance, they have the drawback of having a relatively significant mass.

In order to obtain lighter propeller blades or vanes, it is known to make propeller blades or vanes made of composite material, that is to say by making structural pieces with fibrous reinforcement densified by a matrix.

The new generation of engines requires more compact blade or vane roots. This requirement stems from the need to be able to pivot the blade or vane about its vertical axis in order to adapt its incidence to the flight regime. This requirement, combined with the fact that the blade or vane must be integrated as low as possible on the disk, requires significantly reducing the bulk of the root.

For this purpose, the roots of the new-generation blades or vanes have an axisymmetric or substantially axisymmetric shape and reduced dimensions, unlike the roots of the prior art such as those described in documents US 2013/272893 and US 2013/0017093 which extend over the entire width of the lower part of the blade or vane.

This axisymmetric or quasi-axisymmetric shape is more difficult to manufacture from composite material, particularly when the three-dimensional weaving is used to form the fibrous reinforcement of the blade or vane.

Moreover, the mechanical loading to which the new-generation roots are subjected impose additional stresses. Indeed, in addition to the tensile and bending mechanical loading usually encountered, which can be caused respectively by the centrifugal forces and the impacts with objects, the new-generation roots can be subjected to a significant bending vibration loading due to the absence of a nacelle around the blade or vane to condition the air stream. In order to be able to counter this alternating bending moment, the root is pre-stressed in the hub which generates an additional mechanical loading in circumferential compression.

Disclosure of the Invention

It is therefore desirable to be able to propose a solution for making aircraft propeller blades or vanes made of composite material able to withstand the various mechanical loading, particularly at the level of the root with reduced dimensions.

To this end, the present invention proposes a method for manufacturing a propeller blade or vane made of composite material comprising a fibrous reinforcement densified by a matrix, the method comprising:

making a single-piece fibrous blank by three-dimensional weaving between a plurality of warp yarns and a plurality of weft yarns, the fibrous blank having a flat shape in which the warp yarns extend along a longitudinal direction corresponding to the span direction of the propeller blade or vane to be manufactured and in which the weft yarns extend along a transverse direction corresponding to the chord direction of the propeller blade or vane to be manufactured, the fibrous blank comprising an airfoil part and a root part intended to form respectively at least part of the fibrous reinforcement of the airfoil and of the root of the propeller blade or vane, shaping the fibrous blank to obtain a single-piece fibrous preform comprising an airfoil preform formed by the airfoil part of the fibrous blank and a root preform formed by the root part of the fibrous blank, densifying the fibrous preform by a matrix to obtain a propeller blade or vane made of composite material having a fibrous reinforcement constituted by the fibrous preform and densified by the matrix, and forming a single piece with an integrated root, characterized in that the root part of the fibrous blank comprises a first non-interlinking delimiting a first inner housing opening out at a free end of said root part and extending along the longitudinal direction, and in that the root part includes at least one changing sub-area extending from the airfoil part and in which a plurality of weft yarns located inside the root part of the fibrous blank cross on either side of the first non-interlinking along the transverse direction, the number of weft yarns crossing on either side of the first non-interlinking along the transverse direction in said changing sub-area increasing gradually from the airfoil part to the free end of the root part.

By "weft yarns located inside the root part" or "internal weft yarns" is meant the weft yarns that are not present on the surface of the root part of the fibrous blank.

It is considered that a fibrous blank made by three-dimensional weaving may comprise, in a well-known manner, two-dimensional weaving or another weave on its surface, in order to improve its surface condition.

Making weft yarn crossings at the level of the root part of the fibrous blank makes it possible to confer a certain circumferential stiffness to the root of the blade. Thus, the root of the blade will not only be resistant to the usual tensile and bending forces, but will also be resistant to the circumferential compression.

Consequently, the blade will have, on the one hand, a high circumferential stiffness at the level of the root, highly subject to the circumferential compression, while having on the other hand, a high transverse stiffness at level of the airfoil, which is little subject to the circumferential compression but exposed to higher bending and tensile stresses.

More generally, the continuity of the three-dimensional weaving between the root and the airfoil facilitates the transmission of the various forces without creating a mechanically weak interface. Furthermore, by gradually reducing the number of weft yarn crossings as getting closer the airfoil part and away from the free end of the root part, a smooth transition is ensured between the end of the root part which will have a high circumferential stiffness and the airfoil part which will have a rather transverse stiffness.

According to one particular characteristic of the invention, the root part further includes an end sub-area, extending between the free end of the root part and the changing sub-area, and in which all of the internal weft yarns cross on either side of the first non-interlinking along the transverse direction.

Such a weaving mode makes it possible to confer great robustness to the root of the blade manufactured from said blank, by ensuring excellent circumferential stiffness at the level of the end of the root, which is most exposed to the circumferential compression. The changing sub-area then also makes it possible to achieve a smoother transition between on the one hand, the end sub-area in which the crossing of all of the internal yarns makes it possible to obtain a predominantly circumferential stiffness, and on the other hand the airfoil part in which the stiffness is rather transverse.

According to one particular characteristic of the invention, the airfoil part of the fibrous blank comprises a second and a third non-interlinking delimiting a second and a third inner housing opening out onto the same edge of the airfoil part of the blank on either side of the root part of the fibrous blank along the transverse direction.

These non-interlinkings allows inserting fleeting or light-weight insertion elements into the blank, in order to obtain a lighter propeller blade or vane airfoil, while being substantially as mechanically robust. Furthermore, since the loom used to make the fibrous blank does not allow making a very thick root or airfoil, the insertion element(s) make it possible to increase the thickness of the root or airfoil part without reducing the volume ratio of yarns in the areas intended to be highly mechanically loaded.

According to one particular characteristic of the invention, the first non-interlinking also extends into the airfoil part of the fibrous blank.

Thus, the fibrous blank comprises an inner housing present both in the root part and in the airfoil part. Thus, the insertion element(s) inserted by the first non-interlinking may also allow increasing the thickness of the airfoil part, while maintaining a constant warp/weft ratio as well as a high volume ratio of warp yarns in the area around said insert which is highly loaded in bending. Indeed, the loom used to make the fibrous blank does not allow making a very thick root or airfoil.

According to one particular characteristic of the invention, at most six weft yarns per plane cross on either side of the first non-interlinking along the transverse direction in the airfoil part of the fibrous blank. Preferably, only two weft yarns per plane cross on either side of the first non-interlinking along the transverse direction in the airfoil part of the fibrous blank.

Thus, a blade which allows a very gradual evolution of the orientation of the stiffness from the end of the root to the tip, is obtained: the stiffness is mainly circumferential in the blade root, then hybrid in the lower part of the airfoil which comprises the first non-interlinking, and finally mainly transverse in the upper part of the airfoil which does not comprise the first non-interlinking. The transition between the predominantly circumferential stiffness of the root and the predominantly transverse stiffness in the upper part of the airfoil is therefore smoother with a transition area in the lower part of the airfoil which includes the first non-interlinking.

According to one particular characteristic of the invention, the fibrous blank is made by three-dimensional weaving having an interlock weave.

The use of a three-dimensional weaving with an interlock weave makes it possible to further reduce the risk of delamination within the blade or the propeller.

It is considered that a fibrous blank made by three-dimensional weaving having an interlock weave may comprise another weave on its surface, for example two-dimensional or multi-satin weave, in order to improve its surface condition.

According to another particular characteristic of the invention, the shaping of the fibrous blank is carried out by inserting an insertion element into each non-interlinking of the fibrous blank.

The invention further concerns a propeller blade or vane made of composite material comprising a fibrous reinforcement densified by a matrix, the propeller blade or vane including, along a longitudinal direction, a root and an airfoil, and extending along a transverse direction between a leading edge and a trailing edge, the fibrous reinforcement comprising a fibrous preform having a three-dimensional weaving in a single piece between a plurality of warp yarns extending along the longitudinal direction and a plurality of weft yarns extending along the transverse direction, said fibrous preform comprising a root preform present in the root and an airfoil preform present in the airfoil of the propeller blade or vane, the propeller blade or vane being characterized in that the root preform of the fibrous preform comprises a first non-interlinking delimiting a first inner housing forming a cavity opening out at a free end of the root and in that the root preform includes at least one changing portion extending from the airfoil preform and in which a plurality of weft yarns located inside the root preform cross on either side of the first inner housing along the transverse direction, the number of weft yarns crossing on either side of the first inner housing along the transverse direction in said changing portion increasing gradually from the airfoil preform to the free end of the root preform.

According to one particular characteristic of the invention, the root preform further includes an end portion, extending between the free end of the root preform and the changing portion, and in which all of the internal weft yarns cross on either side of the first inner housing along the transverse direction.

According to one particular characteristic of the invention, the airfoil preform of the fibrous preform comprises a second and a third non-interlinking delimiting a second and a third inner housing opening out onto the same edge of the airfoil preform on either side of the root preform along the transverse direction.

According to another particular characteristic of the invention, the first inner housing also extends into the airfoil preform of the fibrous preform.

According to another particular characteristic of the invention, at most six weft yarns per plane cross on either side of the first inner housing along the transverse direction in the airfoil preform of the fibrous preform. Preferably, only two weft yarns per plane cross on either side of the first inner housing along the transverse direction in the airfoil preform of the fibrous preform.

BRIEF DESCRIPTION OF THE DRAWINGS

FIG. 1 is a schematic view illustrating the 3D weaving of a fibrous blank for the manufacture of a blade.

FIG. 2 is a schematic illustration of the areas of the fibrous blank of FIG. 1.

FIG. 3 is a schematic view illustrating the weaving of the fibrous blank of FIG. 2 along a cutting plane III-III.

FIG. 4 is a schematic view illustrating the weaving of the fibrous blank of FIG. 2 along a cutting plane IV-IV.

FIG. 5 is a schematic view illustrating the weaving of the fibrous blank of FIG. 2 along a cutting plane V-V.

FIG. 6 is a schematic view illustrating the weaving of the fibrous blank of FIG. 2 along a cutting plane VI-VI.

FIG. 7 is an exploded perspective schematic view showing an injection tooling and the placement of the fibrous preform obtained from the fibrous blank of FIGS. 1 to 6 inside it in accordance with one embodiment of the invention.

FIG. 8 is a perspective schematic view showing the injection tooling of FIG. 7 closed.

FIG. 9 is a sectional schematic view showing a flexible-membrane injection tooling and the placement of the fibrous preform obtained from the fibrous blank of FIGS. 1 to 6 inside it in accordance with one embodiment of the invention.

DESCRIPTION OF THE EMBODIMENTS

The invention applies generally to various types of propeller blades or vanes used in aircraft engines. The invention finds an advantageous but not exclusive application in large propeller blades or vanes intended to be integrated into pivoting or variable-pitch systems.

Such propeller blades or vanes are generally provided with a root having both a small bulk and good resistance to tensile, bending and circumferential compression forces. The blade according to the invention may in particular constitute a blade for unducted moving wheels such as in the aeronautical engines called "open rotor" engines.

In the remainder of the description, the exemplary embodiments are described in relation to blades for turbo-prop engines. However, the exemplary embodiments also apply to aircraft propeller vanes.

FIG. 1 very schematically shows a fibrous blank 100 intended to form the fibrous preform 1 of the blade to be made.

The fibrous structure blank 100 is obtained, as schematically illustrated in FIG. 1, by three-dimensional (3D) weaving carried out in a known manner using a jacquard-type loom on which a bundle of warp yarns 101 or strands has been disposed in a plurality of layers of several hundred yarns each, the warp yarns being interlinked by weft yarns 102. The fibrous structure blank 100 is woven in a single piece, the blank extending in a longitudinal direction $D_L$, corresponding to the span direction of the blade to be manufactured, and in a transverse direction $D_T$, corresponding to the chord direction of the blade to be manufactured between a front edge 100*a* and a rear edge 100*b*.

The blank 100 comprises an airfoil part 111 intended to subsequently form part of the airfoil of the blade and defining a first face 111*e* and a second face 111*f* intended to respectively form the extrados and intrados faces of the blade. Thus, the airfoil part 111 extends in the longitudinal direction $D_L$ between a lower edge 100*c* and an upper edge 100*d*.

The fibrous blank 100 further comprises a root part 112 intended to subsequently form part of the blade root, and extending outside the airfoil part 111 along the longitudinal direction $D_L$ to a lower edge 102*c* and set back from the front and rear edges 100*a* and 100*b* along the transverse direction $D_T$. The lower edge 102*c* of the root part 112 corresponds to a free end of said root part 112.

Preferably, as in the illustrated example, the 3D weaving is an "interlock" weave. By "interlock" weave is meant here a weave in which each layer of weft yarns interlinks a plurality of layers of warp yarns, with all the yarns of the same weft column having the same movement in the weave plane.

Other known types of three-dimensional weaving may be used, such as in particular those described in document WO 2006/136755. This document describes in particular making, by weaving in a single piece, reinforcing fibrous structures for pieces such as blades having a first type of core weave and a second type of skin weave which make it possible to confer both the mechanical and aerodynamic properties expected for this type of piece.

The fibrous blank 100 may include a plurality of yarns of various types, particularly ceramic or carbon yarns or a mixture of such yarns. Preferably, the fibrous blank 100 may be made from silicon carbide fibers. In general, the fibrous blank 100 may also be made from fibers constituted of the following materials: alumina, mullite, silica, an aluminosilicate, a borosilicate, carbon, or a mixture of several of these materials.

As the fibrous blank 100 whose thickness and width vary is woven, a certain number of warp yarns are not woven, which makes it possible to define the desired, continuously variable contour and thickness of the blank 100. One example of changing 3D weaving, in particular making it possible to vary the thickness of the blank 100 between a first edge intended to form the leading edge and a second edge of lesser thickness and intended to form the trailing edge, is described in document US 2006/257260. Preferably, the thickness of the trailing edge or leading edge is reduced by exiting weft layers present inside the fibrous blank and not outside, in order to maintain continuity of the wefts located on the surface of the fibrous blank. Thus, the final blade will comprise a fibrous reinforcement with a more satisfactory bending stiffness in the transverse direction $D_T$ and therefore more favorable in case of impact, for example in case of a bird strike.

In accordance with the invention, during weaving, a first non-interlinking 120 is made at least inside the root part 112 of the fibrous blank 100. Preferably, three non-interlinkings are made inside the fibrous blank 100. Indeed, a second non-interlinking 110 is made inside the airfoil part 111 of the fibrous blank 100 and a third non-interlinking 130 is made inside the airfoil part 111 of the fibrous blank 100. The three non-interlinkings 110, 120 and 130 extend along a plane parallel to the surface of the blank 100. The second non-interlinking 110 and the third non-interlinking 130 made inside the airfoil part 111 are located on either side of the first non-interlinking 120 made at least inside the root part 112. Thus, the second non-interlinking 110, the first non-interlinking 120 and the third non-interlinking 130 are disposed along this order along the transverse direction $D_T$.

The first non-interlinking 120 extends in the fibrous blank 100 over a first non-interlinking area delimited by a contour 120*a*. Thus, the first non-interlinking 120 extends in the root part 112 over at least a first portion of the second non-interlinking area delimited by the contour 120*a*. The first non-interlinking 120 thus extends through the root part 112 of the blank 100.

In the root part 112 of the blank 100, the first non-interlinking 120 extends along the transverse direction $D_T$ between the front edge 100*a* and the rear edge 100*b*. Preferably, the first non-interlinking 120 extends set back from the front and rear edges 100*a* and 100*b*, that is to say the first non-interlinking 120 does not open out onto the front and rear edges 100*a* and 100*b*.

In the root part 112 of the blank 100, the first non-interlinking 120 extends along the longitudinal direction $D_L$ between the lower edge 100$c$ of the airfoil part 111 and the lower edge 102$c$ of the root part, and opens out onto the lower edge 102$c$ of the root part. The first non-interlinking 120 may extend set back from the lower edge 100$c$ of the airfoil part 111, that is to say it does not open out into the airfoil part 111 of the blank 100.

However, preferably, the first non-interlinking 120 also extends into the airfoil part 111 of the blank 100. Thus, the first non-interlinking 120 extends into the airfoil part 111 over a second portion of the first non-interlinking area delimited by the contour 120$a$.

In this case, in the airfoil part 111, the first non-interlinking 120 extends along the transverse direction D$_T$ between the front edge 100$a$ and the rear edge 100$b$. Preferably, the first non-interlinking 120 extends set back from the front and rear edges 100$a$ and 100$b$, that is to say the first non-interlinking 120 does not open out onto the front and rear edges 100$a$ and 100$b$. There is course no departure from the framework of the invention if the first non-interlinking 120 opens out onto the front edge 100$a$ and/or the rear edge 100$b$. Furthermore, in the airfoil part 111, the first non-interlinking 120 extends along the longitudinal direction D$_L$ between the lower edge 100$c$ and the upper edge 100$d$. The first non-interlinking 120 obviously opens out onto said lower edge 100$c$, in order to open out into the root part 112. Preferably, the first non-interlinking 120 extends along the longitudinal direction D$_L$ set back from the upper edge 100$d$, that is to say the first non-interlinking 120 does not open out onto the upper edge 100$d$.

Thus, the first non-interlinking 120 locally separates the root part 112 into two woven portions 112$a$ and 112$b$ disposed on either side of the first non-interlinking 120 along the direction of thickness of the blank 100, that is to say along the direction perpendicular to the transverse D$_T$ and longitudinal D$_L$ directions, as illustrated in FIG. 3. In the illustrated example, the first non-interlinking 120 locally separates the airfoil part 111 into a fifth woven portion 114$a$ and a sixth woven portion 114$b$ disposed on either side of the first non-interlinking 120 along the direction of thickness of the blank 100, that is to say along the direction perpendicular to the transverse D$_T$ and longitudinal D$_L$ directions, as illustrated in FIG. 5.

The second non-interlinking 110 extends into the airfoil part 111 over a second non-interlinking area delimited by a contour 110$a$. The non-interlinking 110 thus locally separates the airfoil part 111 into a first woven portion, comprising part of the first face 111$e$ intended to form the extrados face, and a second woven portion, comprising part of the second face 111$f$ intended to form the intrados face.

The second non-interlinking 110 extends along the transverse direction D$_T$ between the front edge 100$a$ and the rear edge 100$b$, and set back from the rear edge 100$b$, that is to say the second non-interlinking 110 does not open out onto the rear edge 100$b$. Preferably, the second non-interlinking 110 extends along the transverse direction D$_T$ set back from the front edge 100$a$, that is to say the second non-interlinking 110 does not open out onto the front edge 100$a$. Preferably, any point belonging to the second non-interlinking 110 is closer to the front edge 100$a$ than to the rear edge 100$b$ along the transverse direction D$_T$.

In the airfoil part 111, the second non-interlinking 110 extends along the longitudinal direction D$_L$ between the lower edge 100$c$ and the upper edge 100$d$. The second non-interlinking 110 opens out onto said lower edge 100$c$, the second non-interlinking 110 opening out onto said lower edge 100$c$ between the front edge 100$a$ and the junction between the root part 112 and the airfoil part 111. Preferably, the second non-interlinking 110 extends along the longitudinal direction D$_L$ set back from the upper edge 100$d$, that is to say the first non-interlinking 110 does not open out onto the upper edge 100$d$.

Thus, the second non-interlinking 110 locally separates the airfoil part 111 into two woven portions 111$a$ and 111$b$ disposed on either side of the second non-interlinking 110 along the direction of thickness of the blank 100, that is to say along the direction perpendicular to the transverse D$_T$ and longitudinal D$_L$ directions.

The third non-interlinking 130 extends in the airfoil part 111 over a third non-interlinking area delimited by a contour 130$a$. The non-interlinking 130 thus locally separates the airfoil part 111 into the first woven portion, comprising part of the first face 111$e$ intended to form the extrados face, and the second woven portion, comprising part of the second face 111$f$ intended to form the intrados face.

The third non-interlinking 130 extends along the transverse direction D$_T$ between the front edge 100$a$ and the rear edge 100$b$, and set back from the front edge 100$a$, that is to say the third non-interlinking 130 does not open out onto the front edge 100$a$. Preferably, the third non-interlinking 130 extends along the transverse direction D$_T$ set back from the rear edge 100$b$, that is to say the third non-interlinking 130 does not open out onto the rear edge 100$b$. Preferably, any point belonging to the third non-interlinking 130 is closer to the rear edge 100$b$ than to the front edge 100$a$ along the transverse direction D$_T$.

In the airfoil part 111, the third non-interlinking 130 extends along the longitudinal direction D$_L$ between the lower edge 100$c$ and the upper edge 100$d$. The third non-interlinking 130 opens out onto said lower edge 100$c$, the third non-interlinking 130 opening out onto said lower edge 100$c$ between the rear edge 100$b$ and the junction between the root part 112 and the airfoil part 111. Preferably, the third non-interlinking 130 extends along the longitudinal direction D$_L$ set back from the upper edge 100$d$, that is to say the non-interlinking 110 does not open out onto the upper edge 100$d$.

Thus, the third non-interlinking 130 locally separates the airfoil part 111 into two woven portions 113$a$ and 113$b$ disposed on either side of the third non-interlinking 130 along the direction of thickness of the blank 100, that is to say along the direction perpendicular to the transverse D$_T$ and longitudinal D$_L$ directions, as illustrated in FIG. 5.

Preferably, in the airfoil part 111, the second non-interlinking 110 and the third non-interlinking 130 extend over a greater length along the longitudinal direction D$_L$ than the first non-interlinking 120.

The fibrous blank 100 is thus composed of several successive areas extending across the entire width of the fibrous blank 100 along the transverse direction D$_T$ and succeeding one another along the longitudinal direction D$_L$, as illustrated in FIG. 2.

The first area Z1 of the fibrous blank 100 corresponds to the area of the root part 112 of the fibrous blank 100. The first area Z1 thus extends across the entire width of the root part 112 of the fibrous blank 100 along the transverse direction D$_T$, and extends between the lower edge 102$c$ of the root part 112 and the lower edge 100$c$ of the airfoil part 111. Thus, the first area Z1 includes only the first non-interlinking 120 as a single non-interlinking.

The first area Z1 comprises a first sub-area Z1$a$, called "end sub-area" which comprises the free end of the root part 112, that is to say the first sub-area Z1$a$ extends from the lower edge 102$c$ of the root part 112. The first area Z1 also comprises a second sub-area Z1$b$, called "changing sub-area", which extends from the lower edge 100c of the airfoil part 111. Preferably, the first sub-area Z1a and the second sub-area Z1b are adjacent, and follow each other along the longitudinal direction $D_L$. Preferably, when the root part 112 has an hourglass shape as illustrated in FIG. 2, the section of smaller thickness of said hourglass, which corresponds to the neck of the blade root 112, forms the delimitation between the first sub-area Z1a and the second sub-area Z1b.

The second area Z2 corresponds to the area of the vane airfoil part 111 in which the three non-interlinkings 110, 120 and 130 are present, in the case where the first non-interlinking 120 also extends into the airfoil part 111. The second area Z2 thus extends across the entire width of the airfoil part 111 of the fibrous blank 100 along the transverse direction $D_T$, and extends from the lower edge 100c of the airfoil part 111. Thus, if it exists, the second area Z2 includes the second non-interlinking 110, the first non-interlinking 120 and the third non-interlinking 130, as illustrated in FIG. 2.

The third area Z3 of the fibrous blank 100 corresponds to the area of the vane airfoil part 111 in which two non-interlinkings are present, if this area exists. Preferably, the third area corresponds to the area of the vane airfoil part 111 in which the second non-interlinking 110 and the third non-interlinking 130 are present, as illustrated in the example of FIG. 2, the first non-interlinking 120 not extending beyond the first area Z1 or the second area Z2. There is of course no departure from the framework of the invention if the third area Z3 corresponds to the area of the vane airfoil part 111 in which the second non-interlinking 110 and the first non-interlinking 120 are present, or the first non-interlinking 120 and the third non-interlinking 130 are present, if this area exists.

The fourth area Z4 of the fibrous blank 100 corresponds to the area of the vane airfoil part 111 in which only a single non-interlinking is present, if this area exists. Preferably, the fibrous blank 100 does not comprise a fourth area Z4, as is the case in the example of FIG. 2. If the fibrous blank 100 comprises a fourth area Z4, the fourth area Z4 comprises the second non-interlinking 110 or the third non-interlinking 130. However, there is no departure from the framework of the invention if the fourth area Z4 corresponds to the area of the vane airfoil part 111 in which only the first non-interlinking 120 is present, if this area exists.

The fifth area Z5 of the fibrous blank 100 corresponds to the area of the vane airfoil part 111 not comprising any non-interlinking. The fifth area Z5 thus extends across the entire width of the airfoil part of the fibrous blank 100 along the transverse direction $D_T$, and extends to the upper edge 100d of the airfoil part 111.

A 3D weaving mode with an interlock weave of the first blank 100 according to the invention is schematically shown in FIGS. 3 to 6. The number of weft yarns schematized is reduced for reasons of simplification of the figures.

FIG. 3 is an enlarged partial view of a warp sectional plane in the first sub-area Z1a of the first area Z1 of the fibrous blank 100 (section III-III in FIG. 2). In this example, the fibrous blank 100 comprises 8 layers of warp yarns 101 extending substantially in the longitudinal direction $D_L$. The 8 layers of warp yarns 101 are interlinked by weft yarns $T_1$ to $T_8$ in the interlinking areas 115 and 125 of the root part 112 of the fibrous blank 100, the weft yarns $T_1$ to $T_8$ extending substantially in the transverse direction $D_T$.

The 8 layers of warp yarns 101 are distributed into a first set 108 of layers of yarns 101 and a second set 109 of layers of yarns 101. The first set 108 and the second set 109 of layers of warp yarns 101 are disposed on either side of the first non-interlinking 120 along the direction of thickness, that is to say along the direction perpendicular to the transverse $D_T$ and longitudinal $D_L$ directions. Thus, the first woven portion 112a of the root part 112 comprises part of the first set 108 of warp yarns 101 and the second woven portion 112b of the root part 112 comprises part of the second set 109 of warp yarns. The first set 108 and the second set 109 of layers of warp yarns 101 join in the interlinking areas 115 and 125.

As illustrated in FIG. 3, in the first sub-area Z1a of the first area Z1, all of the internal layers of weft yarns $T_2$ to $T_7$ cross on either side of the first non-interlinking 120 along the transverse direction. On the other hand, the external layers of weft yarns $T_1$, $T_8$, that is to say those located on the surface of the fibrous blank 100, do not cross other layers of weft yarns, in order to ensure a better surface condition. There is of course no departure from the framework of the invention if all of the internal and external layers of weft yarns cross on either side of the first non-interlinking 120 along the transverse direction.

Thus, in the first sub-area Z1a of the first area Z1, each internal weft yarn crosses the other weft yarns in the first interlinking area 115 and in the second interlinking area 125. All of the internal weft yarns are therefore deflected at the start or upstream of the first non-interlinking 120 along the transverse direction $D_T$, then deflected again at the exit or downstream of the first non-interlinking 120 along the transverse direction $D_T$. Thus, the layers of weft yarns $T_2$ to $T_4$ interlink the first set 108 of warp yarns 101 in the first interlinking area 115, then interlink the second set 109 of warp yarns 101 in the second woven portion 112b and finally interlink the first set 108 of warp yarns 101 in the second interlinking area 125. Conversely, the layers of weft yarns $T_5$ to $T_7$ interlink the second set 109 of warp yarns 101 in the first interlinking area 115, then interlink the first set 108 of warp yarns 101 in the first woven portion 112a and finally interlink the second set 109 of warp yarns 101 in the second interlinking area 125.

Such a crossing of the weft yarns in the root part 112 improves the holding of the fibrous blank 100 around the first non-interlinking 120, and subsequently allows conferring excellent circumferential stiffness to the blade root.

The first area Z1 also comprises the second sub-area Z1b which extends from the lower edge 100c of the airfoil part 111. Such a second sub-area Z1b makes it possible to achieve a transition between, on the one hand, the first sub-area Z1a in which all of the internal weft yarns cross and, on the other hand, the airfoil part in which the percentage of weft yarns that cross is very small. Thus, the second sub-area Z1b has a percentage of crossing of the weft yarns on either side of the first non-interlinking 120 that is gradual along the longitudinal direction $D_L$. More specifically, the second sub-area Z1b has a percentage of crossing of the weft yarns which decreases gradually from the first sub-area Z1a of the root part 112 to the airfoil part 111. A sudden transition between the root part 112 and the airfoil part 111 is thus avoided. Consequently, a blade having a gradual evolution of the orientation of the stiffness between the root and the airfoil is obtained: the stiffness is strongly circumferential in the end of the blade root, then less and less circumferential and more and more transverse as getting closer the airfoil part. However, the stiffness of the blade root remains more circumferential and less transverse than that of the airfoil. The transition between the predominantly circumferential stiffness of the end of the root and the predominantly transverse stiffness in the upper part of the airfoil is therefore smoother.

FIG. 4 is an enlarged partial view of a warp sectional plane in the second sub-area Z1*b* of the first area Z1 of the fibrous blank 100 (section IV-IV in FIG. 2). In the second sub-area Z1*b* of the first area Z1, the 8 layers of warp yarns 101 are interlinked by weft yarns $T_{t1}$ to $T_{t8}$ in the interlinking areas 115 and 125 of the root part 112 of the fibrous blank 100, the weft yarns $T_{t1}$ to $T_{t8}$ extending substantially in the transverse direction $D_T$.

As illustrated in FIG. 4, in the second sub-area Z1*b* of the first area Z1, only part of the internal layers of weft yarns $T_{t2}$ to $T_{t7}$ cross on either side of the first non-interlinking 120 along the transverse direction. The external layers of weft yarns $T_{t1}$ and $T_{t8}$, that is to say those located on the surface of the fibrous blank 100, do not cross other layers of weft yarns, in order to ensure a better surface condition.

Thus, in the second sub-area Z1*b* of the first area Z1, only a percentage of internal weft yarns cross the other weft yarns in the first interlinking area 115 and in the second interlinking area 125. Only a percentage of the internal weft yarns is therefore deflected at the start or upstream of the first non-interlinking 120 along the transverse direction $D_T$, then deflected again at the exit or downstream of the first non-interlinking 120 along the transverse direction $D_T$.

Thus, the layers of weft yarns $T_{t3}$ and $T_{t4}$ interlink the first set 108 of warp yarns 101 in the first interlinking area 115, then interlink the second set 109 of warp yarns 101 in the second woven portion 112*b* and finally interlink the first set 108 of warp yarns 101 in the second interlinking area 125. Conversely, the layers of weft yarns $T_{t5}$ and $T_{t6}$ interlink the second set 109 of warp yarns 101 in the first interlinking area 115, then interlink the first set 108 of warp yarns 101 in the first woven portion 112*a* and finally interlink the second set 109 of warp yarns 101 in the second interlinking area 125. In the example illustrated in FIG. 4, for reasons of simplification of the figures, only four weft yarns cross on either side of the first non-interlinking 120. Preferably, more weft yarns cross on either side of the first non-interlinking 120 in order to ensure sufficient circumferential stiffness in the future blade root.

Preferably, in the second sub-area Z1*b* of the first area Z1, the percentage of internal weft yarns crossing on either side of the first non-interlinking 120 varies gradually from 100% at the junction with the first sub-area Z1*a* to between 5% and 30% at the junction with the airfoil part 111.

FIG. 5 is an enlarged partial view of a warp sectional plane in the second area Z2 of the fibrous blank 100 (section V-V in FIG. 2). In the second area Z2, the 8 layers of warp yarns 101 are interlinked by weft yarns $T_{11}$ to $T_{18}$ in the interlinking areas 105, 115, 125 and 135 of the airfoil part 111 of the fibrous blank 100, the weft yarns $T_{11}$ to $T_{18}$ extending substantially in the transverse direction $D_T$.

The first set 108 and the second set 109 of layers of warp yarns 101 are disposed on either side of the second non-interlinking 110, of the first non-interlinking 120 and of the third non-interlinking 130 along the direction of thickness, that is to say along the direction perpendicular to the transverse $D_T$ and longitudinal $D_L$ directions.

Thus, the first woven portion 111*a*, the third woven portion 113*a* and the fifth woven portion 114*a* of the airfoil part 111 each comprise part of the first set 108 of warp yarns 101, and the second woven portion 111*b*, the fourth woven portion 113*b* and the sixth woven portion 114*b* of the airfoil part 111 each comprise part of the second set 109 of warp yarns. The first set 108 and the second set 109 of layers of warp yarns 101 join in the interlinking areas 105, 115, 125 and 135.

The first interlinking area 115 separates the second non-interlinking 110 from the first non-interlinking 120. The second interlinking area 125 separates the first non-interlinking 120 from the third non-interlinking 130. The third interlinking area 105 comprises part of the front edge 100*a*. The fourth interlinking area 135 comprises part of the rear edge 100*b*. Thus the third interlinking area 105, the second non-interlinking 110, the first interlinking area 115, the first non-interlinking 120, the second interlinking area 125, the third non-interlinking 130 and the fourth interlinking area 135 succeed one another in this order along the transverse direction $D_T$ in the second area Z2.

As illustrated in FIG. 5, only two weft yarns $T_{14}$, $T_{15}$ per plane cross, these two yarns being located at the core of the airfoil part 111 and passing through the airfoil part 111 substantially along the transverse direction $D_T$ along the boundaries of the first, second and third non-interlinkings 110, 120, 130. Preferably, at most six weft yarns per plane cross in the second area Z2, preferably along the boundaries of the first, second and third non-interlinkings 110, 120, 130.

In the example illustrated in FIG. 5, for reasons of simplification, the space between each non-interlinking 110, 120, 130 is very restricted. Preferably, a larger space can be kept between each non-interlinking 110, 120, 130 in order to carry out the three-dimensional weaving of the fibers properly. Additional wefts may be inserted into these spaces between the non-interlinkings 110, 120, 130 in order to compensate for the lack of thickness caused by the absence of non-interlinking.

Thus, in the second area Z2, the two weft yarns $T_{14}$, $T_{15}$ cross at least in the first interlinking area 115 and in the second interlinking area 125. Preferably, the two weft yarns $T_{14}$, $T_{15}$ also cross in the third interlinking area 105 and in the fourth interlinking area 135, as illustrated in the example of FIG. 5. The two weft yarns $T_{14}$, $T_{15}$ are therefore deflected at the start or upstream of the first non-interlinking 120 along the transverse direction $D_T$, then deflected again at the exit or downstream of the first non-interlinking 120 along the transverse direction $D_T$.

Thus, the weft yarns $T_{11}$ to $T_{13}$ interlink the first set 108 of warp yarns 101 across the entire width of the airfoil part 111 along the transverse direction $D_T$. The weft yarns $T_{11}$ to $T_{13}$ therefore interlink the first set 108 of warp yarns 101 in the third interlinking area 105, in the first woven portion 111*a*, in the first interlinking area 115, in the fifth woven portion 114*a*, in the second interlinking area 125, in the third woven portion 113*a* and in the fourth interlinking area 135.

Conversely, the weft yarns $T_{16}$ to $T_{18}$ interlink the second set 109 of warp yarns 101 across the entire width of the airfoil part 111 along the transverse direction $D_T$. The weft yarns $T_{16}$ to $T_{18}$ therefore interlink the second set 109 of warp yarns 101 in the third interlinking area 105, in the second woven portion 111*b*, in the first interlinking area 115, in the sixth woven portion 114*b*, in the second interlinking area 125, in the fourth woven portion 113*b* and in the fourth interlinking area 135.

Such a partial crossing of the weft yarns in the lower part of the airfoil part 111 improves the holding of the fibrous blank 100 around the three non-interlinkings 110, 120 and 130, and subsequently makes it possible to confer a smooth transition between the circumferential stiffness of the blade root and the transverse stiffness of the top of the airfoil, by proposing a hybrid stiffness between circumferential and transverse stiffness.

FIG. 6 is an enlarged partial view of a warp sectional plane in the third area Z3 of the fibrous blank 100 (section VI-VI in FIG. 2). In the third area Z3, the 8 layers of warp yarns 101 are interlinked by weft yarns $T_{21}$ to $T_{28}$ in the interlinking areas 105, 115, 125 and 135 of the airfoil part 111 of the fibrous blank 100, the weft yarns $T_{21}$ to $T_{28}$ extending substantially in the transverse direction $D_T$.

The first set 108 and the second set 109 of layers of warp yarns 101 are disposed on either side of the second non-interlinking 110 and of the third non-interlinking 130 along the direction of thickness, that is to say along the direction perpendicular to the transverse $D_T$ and longitudinal $D_L$ directions.

Thus, the first woven portion 111a and the third woven portion 113a of the airfoil part 111 each comprise part of the first set 108 of warp yarns 101, and the second woven portion 111b and the fourth woven portion 113b of the airfoil part 111 each comprise part of the second set 109 of warp yarns. The first set 108 and the second set 109 of layers of warp yarns 101 join in the interlinking areas 105, 115, 125 and 135.

The third interlinking area 105, the second non-interlinking 110, the common area of the first and second interlinking areas 115 and 125, the third non-interlinking 130 and the fourth interlinking area 135 succeed one another in this order along the transverse direction $D_T$ in the third area Z3.

As illustrated in FIG. 6, preferably, only two weft yarns $T_{24}$, $T_{25}$ per plane cross, these two yarns being located at the core of the airfoil part 111 and passing through the airfoil part 111 substantially along the transverse direction $D_T$ along the boundaries of the second and third non-interlinkings 110 and 130. Preferably, at most six weft yarns per plane cross in the third area Z3, preferably along the boundaries of the second and third non-interlinkings 110 and 130.

Thus, in the third area Z3, the two weft yarns $T_{14}$, $T_{15}$ cross preferably in the third non-interlinking area 105, twice in the common area of the first and second interlinking areas 115 and 125 and in the fourth interlinking area 135, as illustrated in FIG. 6.

The two weft yarns $T_{24}$, $T_{25}$ are therefore deflected at the start or upstream of the second non-interlinking 110 along the transverse direction $D_T$, then deflected again at the exit or downstream of the second non-interlinking 110 along the transverse direction $D_T$, then deflected at the start or upstream of the third non-interlinking 130 along the transverse direction $D_T$, then deflected again at the exit or downstream of the third non-interlinking 130 along the transverse direction $D_T$.

Thus, the weft yarns $T_{21}$ to $T_{23}$ interlink the first set 108 of warp yarns 101 across the entire width of the airfoil part 111 along the transverse direction $D_T$. The weft yarns $T_{21}$ to $T_{23}$ therefore interlink the first set 108 of warp yarns 101 in the third interlinking area 105, in the first woven portion 111a, in the first and second interlinking areas 115 and 125, in the third woven portion 113a and in the fourth interlinking area 135.

Conversely, the weft yarns $T_{26}$ to $T_{28}$ interlink the second set 109 of warp yarns 101 across the entire width of the airfoil part 111 along the transverse direction $D_T$. The weft yarns $T_{26}$ to $T_{28}$ therefore interlink the second set 109 of warp yarns 101 in the third interlinking area 105, in the second woven portion 111b, in the first and second interlinking areas 115 and 125, in the fourth woven portion 113b and in the fourth interlinking area 135.

Such a partial crossing of the weft yarns in the intermediate part of the airfoil part 111 improves the holding of the fibrous blank 100 around the two non-interlinkings 110 and 130, and subsequently makes it possible to confer an even smoother transition between the circumferential stiffness of the blade root and the transverse stiffness of the top of the airfoil, by proposing a hybrid stiffness between circumferential and transverse stiffness.

In the fifth area Z5, there is a classic three-dimensional weaving which consequently has a predominantly transverse stiffness.

Once the weaving is finished, the non-woven yarns present around the fibrous blank 100 are cut to extract the blank. The second, first and third non-interlinkings 110, 120, 130 respectively form in the first fibrous blank 100 second, first and third inner housings which extend into the first fibrous blank 100.

To form the fibrous preform 1 of the blade to be made, the fibrous blank 100 is shaped. Thus, the airfoil part 111 of the fibrous blank 100 is shaped to form an airfoil preform 11 of the preform 1, and the root part 112 of the fibrous blank 100 is shaped to form a root preform 12 of the preform 1.

preferably, the shaping of the fibrous blank 100 is carried out by inserting at least one first insertion element 20 into the first non-interlinking 120. Preferably, one or more second and third insertion elements 10, 30 may also be inserted respectively by the second and third non-interlinkings 110, 130 into the airfoil part 111 of the fibrous blank 100. These insertion elements 10, 20, 30 may be intended to form part of the final piece, or be intended to be withdrawn after the operation of densification of the fibrous preform 1.

The insertion elements 10, 20, 30 may be made of foam or have at least partially a lattice architecture. The insertion elements 10, 20, 30 may also be made at least partially of a transient material, that is to say a material that can be mechanically, chemically or thermally removed.

The insertion elements 10, 20, 30 are preferably made of a non-structural material. The insertion elements 10, 20, 30 that may be intended to form part of the final blade have a mass density lower than the mass density of the fibrous blank densified by the matrix in the final blade. The insertion elements 10, 20, 30 may be made of foam, for example polyurethane. The insertion elements 10, 20, 30 may be made of honeycomb.

The insertion elements 10, 20, 30 may be made of the same material. At least one of the insertion elements 10, 20, 30 may be made of a material other than another of the insertion elements 10, 20, 30. Preferably, the second and third insertion elements 10, 30 intended to be inserted into the second and third non-interlinkings 110, 130 are made of the same material, and the first insertion element 20 intended to be inserted into the first non-interlinking 120 is made of a different material.

The airfoil preform of the fibrous preform 1 obtained generally has the shape of the airfoil of the final blade. A compacting step may be carried out on the fibrous preform 1, for example in order to vary its thickness along the longitudinal direction.

The fibrous preform 1, made as described above, is then densified. The densification of the fibrous preform 1 intended to constitute the fibrous reinforcement of the part to be manufactured consists in filling the porosity of the preform, in all or part of its volume, with the material constituting the matrix.

The densification can be carried out in a manner known per se using the liquid process. The liquid process consists in impregnating the preform with a liquid composition containing a precursor of the matrix material. The precursor is usually in the form of a polymer, such as a high-performance epoxy resin, possibly diluted in a solvent. The preform is placed in a mold that can be sealingly closed with a housing having the shape of the final molded blade. The mold is then closed and the liquid matrix precursor (for example, a resin) is injected into the entire housing to impregnate the entire fibrous part of the preform.

The transformation of the precursor into a matrix, namely its polymerization, is carried out by heat treatment, generally by heating the mold, after removal of any solvent and crosslinking of the polymer, the preform being always maintained in the mold having a shape corresponding to that of the piece to be made.

In the case of the formation of a carbon or ceramic matrix, the heat treatment consists in pyrolyzing the precursor to transform the matrix into a carbon or ceramic matrix depending on the precursor used and the pyrolysis conditions. For example, liquid ceramic precursors, in particular SiC, may be resins of the polycarbosilane (PCS) or polytitanocarbosilane (PTCS) or polysilazane (PSZ) type, while liquid carbon precursors may be resins with a relatively high coke content, such as phenolic resins. Several consecutive cycles, from impregnation to heat treatment, may be carried out to achieve the desired degree of densification.

According to one aspect of the invention, in the case in particular of the formation of an organic matrix, the densification of the fibrous preform may be carried out by the well-known transfer molding method called RTM (Resin Transfer Molding). In accordance with the RTM method, the fibrous preform is placed in a mold having the external shape of the piece to be made. A thermosetting resin is injected into the inner space of the mold which comprises the fibrous preform. A pressure gradient is generally established in this inner space between the location where the resin is injected and the resin discharge orifices in order to control and optimize the impregnation of the preform with the resin.

As illustrated in FIGS. 7 and 8, the injection of a liquid matrix precursor composition into the fibrous preform and its transformation into a matrix are here carried out in an injection tooling 60 which comprises a first shell 61 comprising in its center a first imprint 61a partly corresponding to the shape and dimensions of the blade to be made and a second shell 62 comprising in its center a second imprint 62a partly corresponding to the shape and dimensions of the blade to be made.

Once the tooling 60 is closed as illustrated in FIG. 8, the first and second imprints 61a and 62a respectively of the first and second shells 61 and 62 together define an internal volume having the shape of the blade to be made and in which the fibrous preform 1 is placed. A compaction of the fibrous preform can be carried out with the closing of the tooling 60 in order to obtain a determined fiber rate in the preform. In this case, a compaction pressure is applied to the shells 61 and 62 for example by means of a press. The compaction of the fibrous preform can also be carried out in a separate tooling before introduction into the injection tooling.

The tooling 60 further comprises means for carrying out the injection of a liquid matrix precursor and the transformation of this precursor into a matrix. More specifically, in the example described here, the first shell 61 of the tooling 60 comprises an injection port 61e intended to allow the injection of a liquid matrix precursor composition into the fibrous preform while the second shell comprises a discharge port 62s intended to cooperate with a pumping system for vacuuming the tooling and drawing air during the injection. The injection tooling 60 also comprises a lower part 63 and an upper part 64 between which the first and second shells 61 and 62 are placed, the lower part 63 and the upper part 64 being equipped with heating means (not represented in FIG. 8).

Once the tooling 60 is closed, the blade is molded by impregnating the preform 1 with a thermosetting resin that is polymerized by heat treatment. For this purpose, the well-known injection or transfer molding method called RTM (Resin Transfer Molding) is used. In accordance with the RTM method, a resin, for example a thermosetting resin, is injected via the injection port 61e of the first shell 61 into the internal volume occupied by the preform 1. The port 62s of the second shell 62 is connected to a discharge conduit maintained under pressure (not represented in FIG. 8). This configuration allows the establishment of a pressure gradient between the lower part of the preform 1 where the resin is injected and the upper part of the preform 1 located in the vicinity of the port 62s. In this way, the resin injected substantially at the level of the lower part of the preform 1 will gradually impregnate the entire preform by circulating in it up to the discharge port 62s through which the surplus is discharged. Of course, the first and second shells 61 and 62 of the tooling 60 can respectively comprise several injection ports and several discharge ports.

The resin used may be for example an epoxy resin with a temperature class of 180° C. (maximum temperature supported without loss of characteristics). Resins suitable for RTM methods are well known. They preferably have a low viscosity to facilitate their injection into the fibers. The choice of temperature class and/or the chemical nature of the resin is/are determined according to the thermomechanical loads to which the piece must be subjected. Once the resin has been injected throughout the reinforcement, it is polymerized by heat treatment in accordance with the RTM method.

The densification of the fibrous preform can also be carried out in a well-known manner by membrane injection, as illustrated in FIG. 9. This injection mode allows complete control of the amount of resin or slurry injected, thus ensuring an accurate and suitable fiber volume ratio. Consequently, the mechanical characteristics of the piece thus manufactured are improved, with low variability from one piece to another.

The fibrous preform 1 is disposed in a mold 70, which comprises on the one hand an impregnation chamber 71 in which the fibrous preform is disposed in order to be densified by a matrix by the injection of an impregnation fluid via the injection orifices 71a, and on the other hand a compaction chamber 72 into which a compression fluid is injected via the injection orifices 72a in order to apply pressure to the fibrous preform 1 during its densification by the matrix. The impregnation chamber 71 and the compaction chamber 72 are separated by a flexible membrane 73. The membrane 73 makes it possible to apply the pressure to the fibrous preform 1 installed in the impregnation chamber 71, the compression fluid applying a pressure P to the membrane 73 which deforms and thus in turn applies pressure to the fibrous preform 1. The flexible membrane 73 is for example made of silicone.

Depending on the size, thickness and shape of the propeller blade or vane to be manufactured, a different compression and impregnation fluid injection sequence will be preferred.

For example, the impregnation fluid, for example a resin, can first be injected into the impregnation chamber where the fibrous preform is disposed. Once the injection of the impregnation fluid is complete, the compression fluid, for example water, is injected into the compaction chamber so as to exert pressure on the flexible membrane. The flexible membrane thus applies pressure to the fibrous preform, allowing the impregnation fluid to penetrate into said preform.

The preform is then subjected to a heat treatment while the pressure exerted by the membrane is maintained, in order to form a matrix in the porosities of the fibrous preform.

According to another example, the compression fluid can first be injected into the compaction chamber. Thus, even before the injection of the impregnation fluid, a pressure, whose value allows obtaining the desired fiber volume ratio, is already applied to the fibrous preform via the flexible membrane. The injection of the impregnation fluid then begins, which can be carried out while the compression fluid is still being injected in order to compensate for the pressure losses, especially in the case where the impregnation fluid is slurry. Such an injection sequence is described for example in document WO 2019/197757 A1.

After injection and polymerization, the blade is demolded.

Preferably, the first insertion element(s) 20 is/are withdrawn so as to obtain a hollow blade root. The second and third insertion element(s) 10, 30 may also be withdrawn to obtain an at least partially hollow blade airfoil. If insertion elements made of a transient material had been inserted into the fibrous preform, they may be removed during the polymerization of the resin, or removed during demolding or after demolding of the blade. Finally, one or more insertion elements 10, 20, 30 may be retained in the blade.

A trimming or machining step may be performed on the piece made to obtain the propeller blade or vane to be made.

The densification methods described above allow making, from the fibrous preforms of the invention, mainly propeller blades or vanes made of organic-matrix composite (OMC), carbon matrix composite (C/C) and ceramic matrix composite (CMC) material.

The invention claimed is:

1. A method for manufacturing a propeller blade or vane made of composite material comprising a fibrous reinforcement densified by a matrix, the method comprising:

making a single-piece fibrous blank by three-dimensional weaving between a plurality of warp yarns and a plurality of weft yarns, the fibrous blank-having a flat shape in which the warp yarns extend along a longitudinal direction corresponding to the span direction of the propeller blade or vane to be manufactured and wherein the weft yarns extend along a transverse direction corresponding to the chord direction of the propeller blade or vane to be manufactured, the fibrous blank comprising an airfoil part and a root part intended to form respectively at least part of the fibrous reinforcement of the airfoil and of the root of the propeller blade or vane, shaping the fibrous blank to obtain a single-piece fibrous preform comprising an airfoil preform formed by the airfoil part of the fibrous blank and a root preform formed by the root part of the fibrous blank, densifying the fibrous preform by a matrix to obtain a propeller blade or vane made of composite material having a fibrous reinforcement constituted by the fibrous preform and densified by the matrix, and forming a single piece with an integrated root, wherein the root part of the fibrous blank comprises a first non-interlinking delimiting a first inner housing opening out at a free end of said root part and extending along the longitudinal direction, and wherein the root part includes at least one changing sub-area extending from the airfoil part and wherein a plurality of weft yarns located inside the root part of the fibrous blank cross on either side of the first non-interlinking along the transverse direction, the number of weft yarns crossing on either side of the first non-interlinking along the transverse direction in said changing sub-area increasing gradually from the airfoil part to the free end of the root part.

2. The manufacturing method according to claim 1, wherein the root part further includes an end sub-area extending between the free end of the root part and the changing sub-area and wherein all of the internal weft yarns cross on either side of the first non-interlinking along the transverse direction.

3. The manufacturing method according to claim 1, wherein the airfoil part of the fibrous blank comprises a second and a third non-interlinking delimiting a second and a third inner housing opening out onto the same edge of the airfoil part of the blank on either side of the root part of the fibrous blank along the transverse direction.

4. The manufacturing method according to claim 1, wherein the first non-interlinking also extends into the airfoil part of the fibrous blank.

5. The manufacturing method according to claim 4, wherein at most six weft yarns per plane cross on either side of the first non-interlinking along the transverse direction in the airfoil part of the fibrous blank.

6. The manufacturing method according to claim 5, wherein only two weft yarns per plane cross on either side of the first non-interlinking along the transverse direction in the airfoil part of the fibrous blank.

7. The manufacturing method according to claim 1, wherein the fibrous blank is made by three-dimensional weaving having an interlock weave.

8. The manufacturing method according to claim 1, wherein the shaping of the fibrous blank is carried out by inserting an insertion element into each non-interlinking of the fibrous blank.

9. A propeller blade or vane made of composite material comprising a fibrous reinforcement densified by a matrix, the propeller blade or vane including, along a longitudinal direction, a root and an airfoil, and extending along a transverse direction between a leading edge and a trailing edge, the fibrous reinforcement comprising a fibrous preform having a three-dimensional weaving in a single piece between a plurality of warp yarns extending along the longitudinal direction and a plurality of weft yarns extending along the transverse direction, said fibrous preform comprising a root preform present in the root and an airfoil preform present in the airfoil of the propeller blade or vane, wherein the root preform of the fibrous preform comprises a first non-interlinking delimiting a first inner housing forming a cavity opening out at a free end of the root and wherein the root preform includes at least one changing portion extending from the airfoil preform and wherein a plurality of weft yarns located inside the root preform cross on either side of the first inner housing along the transverse direction, the number of weft yarns crossing on either side of the first inner housing along the transverse direction in said changing portion increasing gradually from the airfoil preform to the free end of the root preform.

10. The propeller blade or vane according to claim 9, wherein the root preform further includes an end portion extending between the free end of the root preform and the changing portion and wherein all of the internal weft yarns cross on either side of the first inner housing along the transverse direction.

11. The propeller blade or vane according to claim 9, wherein the airfoil preform of the fibrous preform comprises a second and a third non-interlinking delimiting a second and a third inner housing opening out onto the same edge of the airfoil preform on either side of the root preform along the transverse direction.

12. The propeller blade or vane according to claim 9, wherein the first inner housing also extends into the airfoil preform of the fibrous preform.

13. The propeller blade or vane according to claim 12, wherein at most six weft yarns per plane cross on either side of the first inner housing along the transverse direction in the airfoil preform of the fibrous preform.

14. The propeller blade or vane according to claim 13, wherein only two weft yarns per plane cross on either side of the first inner housing along the transverse direction in the airfoil preform of the fibrous preform.

* * * * *